United States Patent
Kienzle

(10) Patent No.: US 8,024,059 B2
(45) Date of Patent: Sep. 20, 2011

(54) METHOD AND SYSTEM FOR DETERMINING A DEMAND ON A PRODUCT VARIANT USING BILL OF MATERIAL

(75) Inventor: Stefan Kienzle, St. Leon-Rot (DE)

(73) Assignee: SAP AG, Walldorf (DE)

( * ) Notice: Subject to any disclaimer, the term of this patent is extended or adjusted under 35 U.S.C. 154(b) by 304 days.

(21) Appl. No.: 12/212,655

(22) Filed: Sep. 18, 2008

(65) Prior Publication Data

US 2009/0204248 A1    Aug. 13, 2009

Related U.S. Application Data

(60) Provisional application No. 61/027,831, filed on Feb. 12, 2008.

(51) Int. Cl.
*G06F 19/00* (2011.01)

(52) U.S. Cl. .................................... 700/107; 700/106
(58) Field of Classification Search ............... 700/106, 700/107

See application file for complete search history.

(56) References Cited

U.S. PATENT DOCUMENTS

2006/0052896 A1* 3/2006 Woehler .................. 700/107
2006/0173953 A1* 8/2006 Salzsauler ................ 709/203

* cited by examiner

*Primary Examiner* — Ryan A Jarrett

(57) ABSTRACT

Disclosed is a method and system for receiving a product parts list containing parts for creating a product variant of a product and updating a bill of material with the parts and a selection condition to identify a part of the product variant. The method includes determining a characteristic and a characteristic value of the parts of the product variant and generating a variant demand object for the product variant.

14 Claims, 4 Drawing Sheets

FIG. 3

GEARBOX_BILL_OF_MATERIAL — 310

| NO. | PART | QUANTITY (PC) | SELECTION CONDITION |
|---|---|---|---|
| 1 | PART A-00 | 1 | PART A-00 = '1' |
| 2 | PART A-01 | 1 | PART A-01 = '1' |
| 3 | PART A-02 | 1 | PART A-02 = '1' |
| 4 | PART B-00 | 1 | PART B-00 = '1' |
| 5 | PART B-00 | 3 | PART B-00 = '3' |
| 6 | PART C-00 | 1 | PART C-00 = '1' |
| 7 | PART D-00 | 1 | PART D-00 = '1' |
| 8 | PART E-00 | 1 | PART E-00 = '1' |
| 9 | PART F-02 | 2 | PART F-02 = '2' |
| 10 | PART G-00 | 8 | PART G-00 = '8' |
| ... | ... | ... | ... |

PRODUCT_PARTS_LIST — 305

| CALL - ID. | NO. | PART | QUANTITY (PC) |
|---|---|---|---|
| #1 | 1 | PART C-00 | 1 |
| #1 | 2 | PART E-00 | 1 |
| #1 | 3 | PART F-02 | 2 |
| #1 | 4 | PART G-00 | 8 |
| #1 | ... | ... | ... |
| #1 | 40 | Part n-00 | 1 |

VARIANT_DEMAND_OBJECT

PRODUCT = 'GEARBOX'
DELIVERY DATE = MM/DD/YYYY
ACCOUNT = 'CALL #1'

| NO. | CHARACTERISTIC | CHARACTERISTIC VALUE |
|---|---|---|
| 1 | PART C-00 | 1 |
| 2 | PART E-00 | 1 |
| 3 | PART F-02 | 2 |
| 4 | PART G-00 | 8 |
| ... | ......... | ... |
| 40 | Part D-00 | 1 |

… (1)

METHOD AND SYSTEM FOR DETERMINING A DEMAND ON A PRODUCT VARIANT USING BILL OF MATERIAL

This application claims the benefit of and priority to U.S. Provisional Patent Application No. 61/027,831, filed Feb. 12, 2008, titled "METHOD AND SYSTEM FOR DETERMINING A DEMAND ON A PRODUCT VARIANT USING BILL OF MATERIAL," which is incorporated herein by reference in its entirety.

FIELD OF THE INVENTION

The invention generally relates to the field of supply chain management and specifically to determine a demand on a product variant using a bill of material.

BACKGROUND OF THE INVENTION

When a supplier receives an order from a manufacturer such as a car manufacturer, the order is typically received as a list of parts rather than a product list. In such orders, it is often difficult for the supplier to determine a plan for manufacturing and delivering the product since the planning and scheduling of the jobs are done on a product basis and not based on the parts. The supplier has to manually determine the product that has to be manufactured or assembled. It is even more challenging in the case where the product manufactured has a number of variants since the product variant also has to be determined. After the product variant is determined, the demand on the products from various orders is calculated and then the production of the products is planned. The manual process of determining the product variants is time consuming, inefficient and affects a delivery schedule of the products.

SUMMARY OF THE INVENTION

What is described is a method and system for receiving a product parts list containing parts for creating a product variant of a product and updating a bill of material with the parts and a selection condition to identify a part of the product variant. The method includes determining a characteristic and a characteristic value of the parts of the product variant and generating a variant demand object representing the product variant.

BRIEF DESCRIPTION OF THE DRAWINGS

FIG. 3 is a set of tables for an exemplary product parts list, variant demand object, and a bill of material according to an embodiment of the invention.

DETAILED DESCRIPTION

What is described is a method and system for receiving a product parts list containing parts for creating a product variant of a product and updating a bill of material with the parts and a selection condition to identify a part of the product variant. The method includes determining a characteristic and a characteristic value of the parts of the product variant and generating a variant demand object for the product variant.

An integrated product and process engineering allows collecting data for an entire lifecycle of a product which is particularly useful for products with a number of variants. The integrated product and process engineering allows documenting, tracking, and managing information of the product at each stage in a development process. It allows holding information about various product variants in a bill of material. In an embodiment, a product may be a gearbox and the product variants may include an automatic transmission gearbox and a manual transmission gearbox.

When a supplier receives an order from a manufacturer such as a car manufacturer, the order is received as parts list rather than a product list. It is often difficult for the supplier to determine the products from the parts list that are required by the car manufacturer which results in an inefficient scheduling or planning of the manufacturing and the delivery of the order. The production planning may be made more efficient by determining the order in terms of products and product variants rather than the parts of the product variant.

Figure 1:
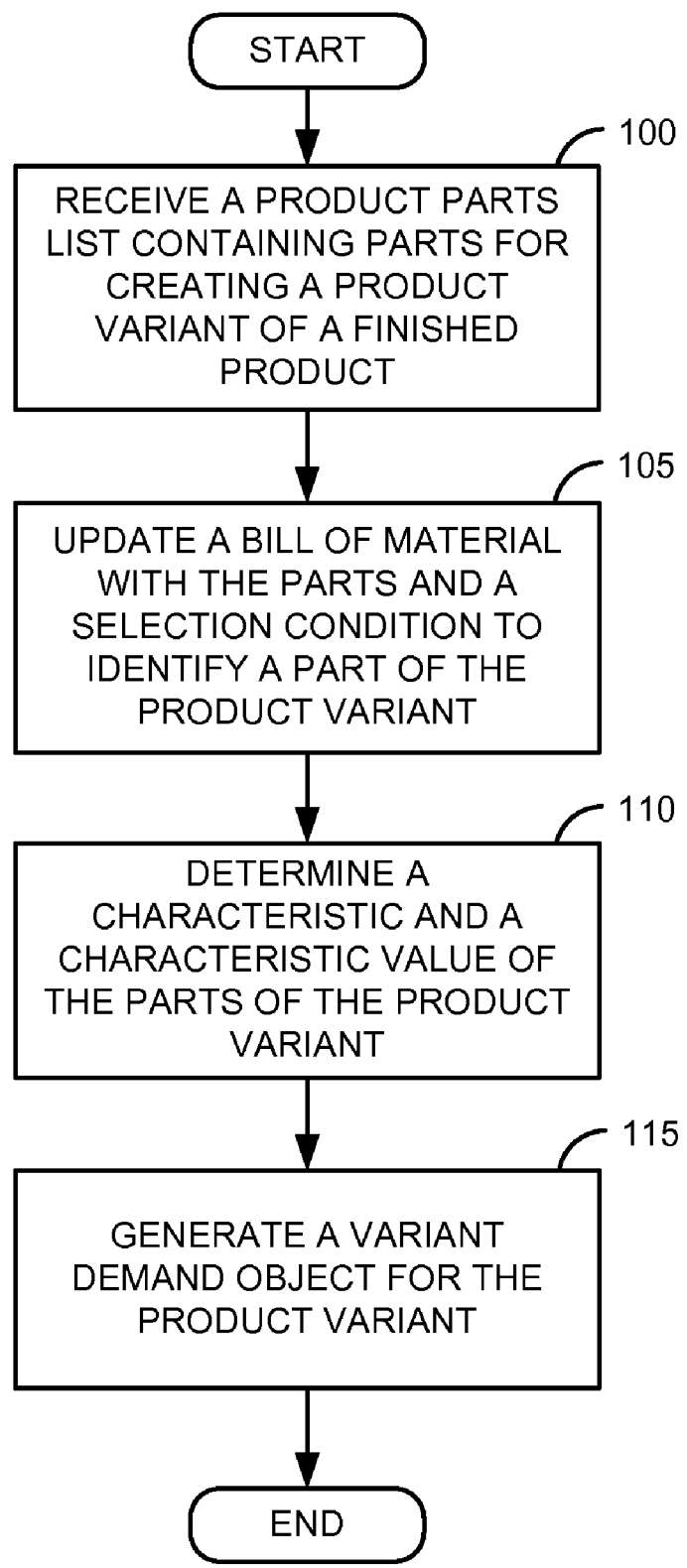
FIG. 1 is a flow diagram for generating a variant demand object according to an embodiment of the invention.

FIG. 1 is a flow diagram for generating a variant demand object according to an embodiment of the invention. At step 100, a product parts list is received. The product parts list contains a list of parts that are necessary to manufacture a particular variant of the product. For example, the product parts list may contain a list of parts that are necessary to manufacture a product variant of the gearbox such as an automatic gearbox. In an embodiment, the product parts list may be received in a file format that includes an extensible markup language (XML). The product parts list contains a name of the part, and a quantity of the part.

At step 105, a bill of material representing the product is updated with the parts and a selection condition that identifies a part of the product variant. The bill of material contains a list of parts of all possible product variants. At step 110, a characteristic and a characteristic value of the parts of the product variant are determined. The characteristic and the characteristic value are used as the selection condition to identify the part of the product variant. The characteristic may be defined as a parameter that distinguishes the part from another part. In an embodiment, the characteristic is determined as a name of the part and the characteristic value is determined as a quantity of the part. A combination of the name of the part and the quantity of the part is used as the selection condition.

At step 115, a variant demand object is generated that represents the product variant. The variant demand object contains the characteristic and the characteristic value of the parts of the product variant. The variant demand object may be used to determine the demand on the product variant.

Figure 2:
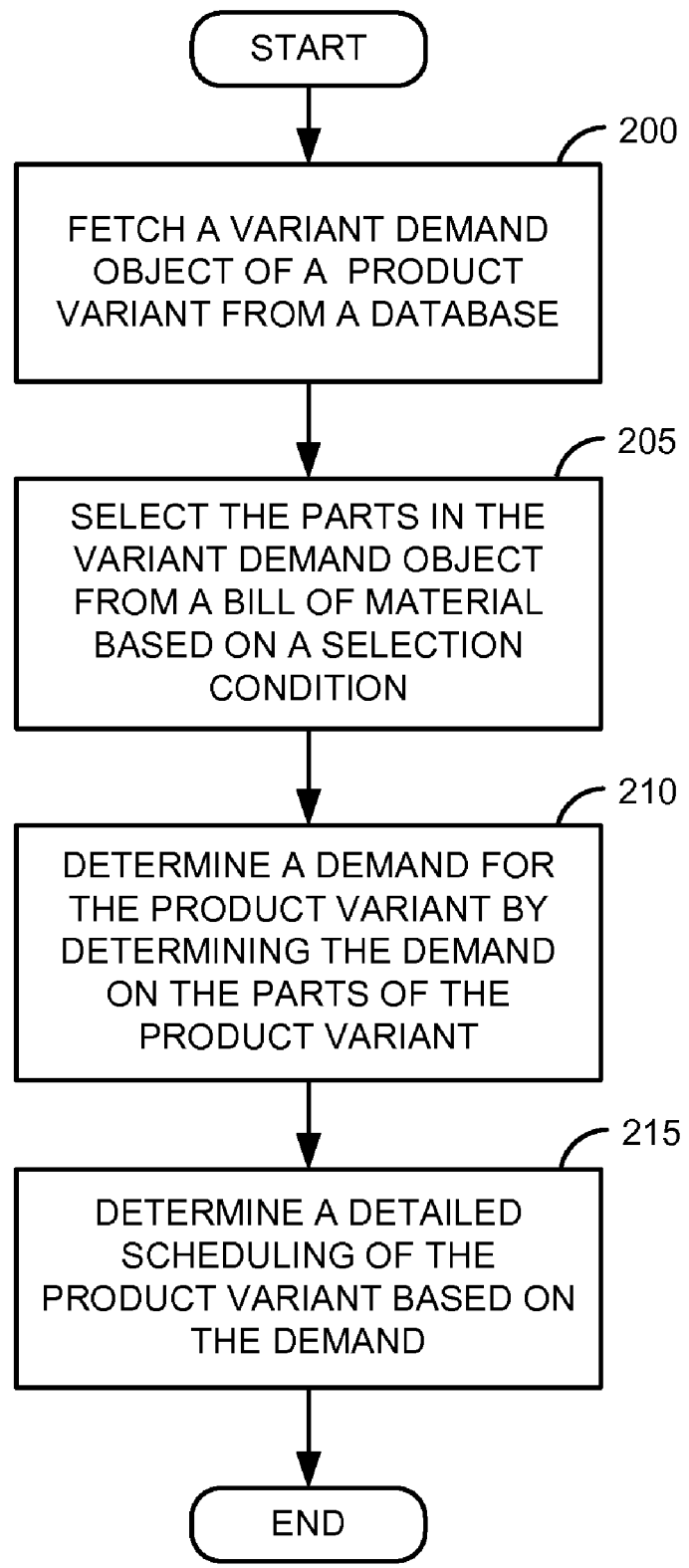
FIG. 2 is a flow diagram for determining a demand on the product variant according to an embodiment of the invention.

FIG. 2 is a flow diagram for determining a demand on the product variant according to an embodiment of the invention. At step 200, a variant demand object of a product variant is fetched from a database. At step 205, the bill of material is queried to fetch the parts contained in the variant demand object based on the selection condition. Once the parts are obtained from the bill of material, at step 210, the demand on the product variant is determined by a bill of material explosion, that is, by determining a demand on the parts of the product variant. At step 215, a detailed scheduling for manufacturing and delivering the product variant is determined based on the demand of the product variant.

FIG. 3 is a set of tables for an exemplary product parts list, variant demand object, and a bill of material according to an embodiment of the invention. Table product_parts_list 305 contains a list of parts for a product variant such as an automatic gearbox. The column "CALL-ID" indicates a sequence in which the product parts list was received. The column "NO." indicates the number of parts in the product parts list. The column "PART" indicates a name of the part of the product variant and the column "QUANTITY" indicates a quantity of the part.

A bill of material is a parts list of components needed to complete a saleable product. The bill of material is a complete, formally structured list of the components that make up a product or assembly. The list contains an object number of each component, together with the quantity and unit of measure. For example, the bill of material for the saleable product such as a personal computer would list the computer, its major sub-assemblies such as a mother board, a chassis, a modem, a keyboard, a display as well as additional materials needed such as shipping box, a user manual, packaging, and packaging labels. A bill of material explosion determines all the components that are there in a sales order, determines the materials required to manufacture the components and the cost involved in manufacturing the components. Material requirement planning is a production planning and an inventory control system used to manage a manufacturing process. The material requirement planning is performed by a bill of material explosion.

Table gearbox_bill_of_material 310 represents the bill of material for the product gearbox containing a list of parts that make up the gearbox. Table gearbox_bill_of_material 310 contains a list of parts 315 of all possible product variants. The bill of material representing the product gearbox is updated with the parts of the product variant when the product parts list is received. Table gearbox_bill_of_material 310 contains a "selection condition" that allows identifying a part of a product variant.

A variant demand object of the product variant contains the parts and quantities of the parts required to manufacture the product variant. The parts and the quantities are obtained from the product parts list. In an embodiment, the variant demand object contains a name of the part as a characteristic and a quantity of the part as a characteristic value. Table variant_demand_object 330 depicts the variant demand object for automatic gearbox. Table variant_demand_object 330 contains name of the parts in column "CHARACTERISTIC" and quantities of the parts in column "CHARACTERISTIC VALUE". Table variant_demand_object 330 also contains details 335 such as "PRODUCT", "DELIVERY DATE" and "ACCOUNT". "PRODUCT" indicates a product to which the product variant belongs to, "DELIVERY DATE" indicates a date by when the product variant has to be delivered and the "ACCOUNT" indicates the sequence in which the products parts list is received.

During production planning, the demand on the product variant automatic gearbox is determined by the material resource planning which involves the bill of material explosion for the product gearbox. The bill of material explosion is done using the table variant_demand_object 330 and table gearbox_bill_of_material 310. The table gearbox_bill_of_material 310 is queried to obtain the parts of the product variant depicted in table variant_demand_object 330. The parts in table gearbox_bill_of_material 310 whose "SELECTION CONDITION" matches the characteristic and the characteristic value in table variant_demand_object 330 are obtained. In an embodiment, the parts depicted in rows 320 of table gearbox_bill_of_material 310 are chosen as their "SELECTION CONDITION" matches the characteristic and the characteristic value for the parts in table variant_demand_object 330. The demand is determined on the selected parts. In this way, the demand is determined for a product variant that enables production planning and detailed scheduling on a product variant level. This allows an efficient manufacturing and delivery of the products.

Figure 4:
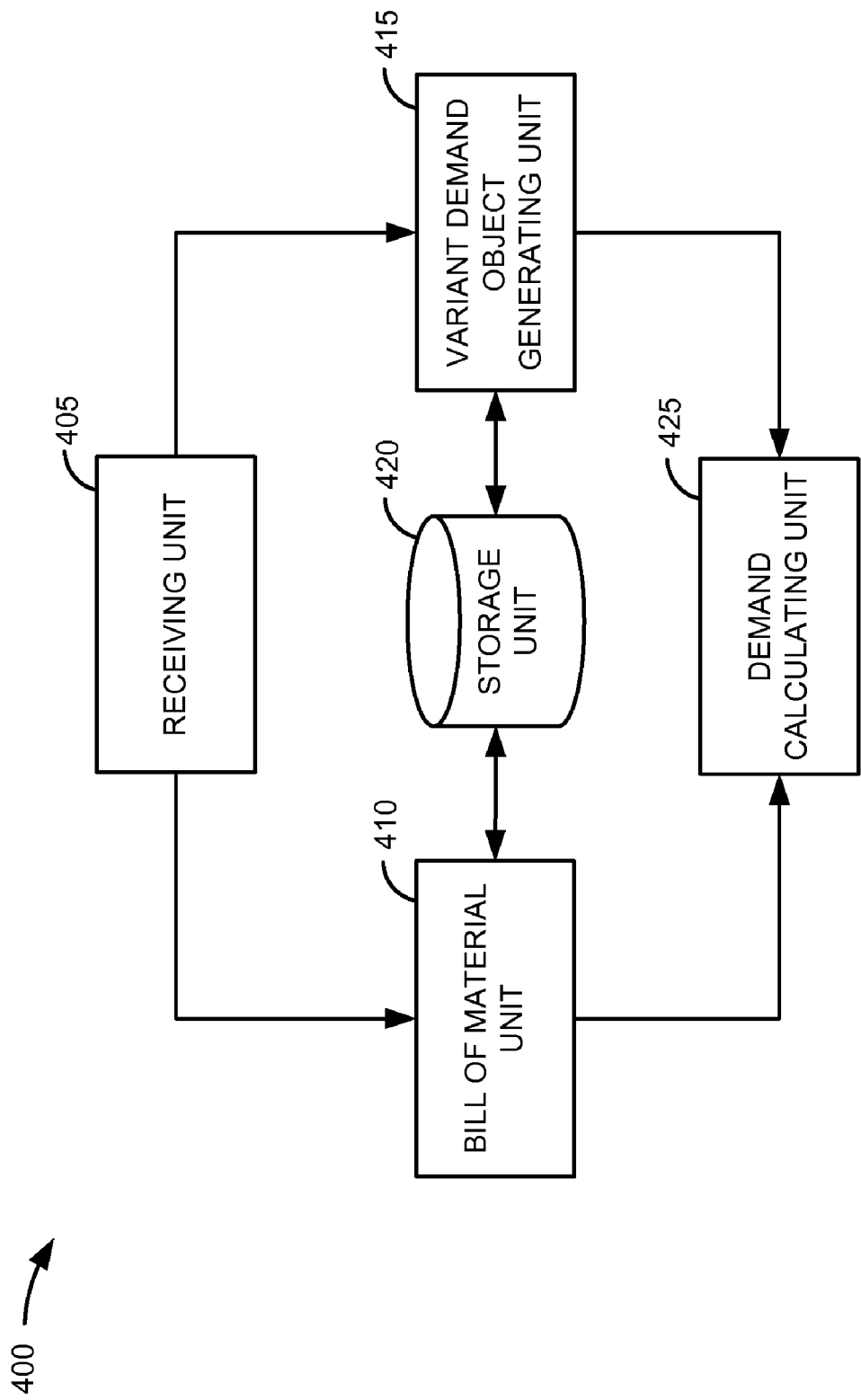
FIG. 4 is a block diagram of a system to calculate a demand on a product variant according to an embodiment of the invention.

FIG. 4 is a block diagram of a system to calculate a demand on a product variant according to an embodiment of the invention. System 400 includes receiving unit 405 to receive a product parts list that contains parts for creating a product variant of a product. In an embodiment, the product parts list is received in a file format that includes an XML. Bill of material unit 410 connected to receiving unit 405 updates a bill of material with the parts and quantities of the parts received from the products parts list. Bill of material unit 410 also updates a selection condition in the bill of material that identifies a part of the product variant. Variant demand object generating unit 415 connected to receiving unit 405 generates a variant demand object that represents the product variant. Bill of material unit 410 and variant demand object generating unit 415 are connected to a storage unit 420 to persist the bill of material and the variant demand object. Demand calculating unit 425 connected to the bill of material unit 410 and variant demand object generating unit 415 calculates a demand on the product variant represented by the variant demand object.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computer implemented method, comprising:
receiving a product parts list containing parts for creating a product variant of a product;
updating a bill of material with the parts and a selection condition to identify a part of the product variant;
determining a characteristic and a characteristic value of the parts of the product variant; and
generating a variant demand object for the product variant containing the characteristic and the characteristic value.

2. The computer implemented method in claim 1 further comprising determining a demand for the product variant by using the variant demand object and the bill of material.

3. The computer implemented method in claim 2, wherein determining the demand comprises selecting the parts and a quantity of the parts from the bill of material based on the selection condition.

4. The computer implemented method in claim 1, wherein the bill of material further comprises a complete list of the parts for product variants of the product.

5. The computer implemented method in claim 1, wherein determining the characteristic and the characteristic value comprises assigning a part name to the characteristic and a quantity of the part to the characteristic value.

6. The computer implemented method in claim 1 further comprising determining the selection condition by equating the characteristic to the characteristic value.

7. The computer implemented method in claim 1 further comprising determining a production planning and detailed scheduling of the product variant based on the variant demand object.

8. The computer implemented method in claim 1 further comprising receiving the product parts list in a file format that includes an extensible markup language.

9. A system, comprising:
   a receiving unit to receive a product parts list containing parts for creating a product variant of a product;
   a bill of material unit electronically coupled to the receiving unit to update a bill of material with the parts and a selection condition;
   a variant demand object generating unit electronically coupled to the receiving unit to generate a variant demand object for the product variant containing a characteristic and a characteristic value; and
   a storage unit to persist the bill of material and the variant demand object.

10. An article of manufacture, comprising:
    a machine readable medium having instructions which when executed by a machine cause the machine to:
    receive a product parts list containing parts for creating a product variant of a product;
    update a bill of material with the parts and a selection condition to identify a part of the product variant;
    determine a characteristic and a characteristic value of the parts of the product variant; and
    generate a variant demand object for the product variant containing the characteristic and the characteristic value.

11. The article of manufacture in claim 10, wherein the machine readable medium provides instructions, which when executed by a machine cause the machine to determine a demand for the product variant by using the variant demand object and the bill of material.

12. The article of manufacture in claim 11, wherein the machine readable medium provides instructions, which when executed by a machine cause the machine to select the parts and a quantity of the parts from the bill of material based on the selection condition.

13. The article of manufacture in claim 10, wherein the machine readable medium provides instructions, which when executed by a machine cause the machine to determine a production planning and detailed scheduling of the product variant based on the variant demand object.

14. The article of manufacture in claim 10, wherein the machine readable medium provides instructions, which when executed by a machine cause the machine to assign a part name to the characteristic and a quantity of the part to the characteristic value.

* * * * *